July 24, 1956     J. S. MACDONALD     2,755,678
GEAR SYSTEMS Filed Jan. 22, 1954     8 Sheets-Sheet 1

Inventor
James Stewart Macdonald

July 24, 1956 — J. S. MACDONALD — 2,755,678
GEAR SYSTEMS
Filed Jan. 22, 1954 — 8 Sheets-Sheet 2

July 24, 1956  J. S. MACDONALD  2,755,678
GEAR SYSTEMS
Filed Jan. 22, 1954  8 Sheets-Sheet 3

July 24, 1956  J. S. MACDONALD  2,755,678
GEAR SYSTEMS
Filed Jan. 22, 1954  8 Sheets-Sheet 4

July 24, 1956  J. S. MACDONALD  2,755,678
GEAR SYSTEMS

Filed Jan. 22, 1954  8 Sheets-Sheet 7

July 24, 1956     J. S. MACDONALD     2,755,678
GEAR SYSTEMS Filed Jan. 22, 1954     8 Sheets-Sheet 8

United States Patent Office 2,755,678
Patented July 24, 1956

2,755,678

GEAR SYSTEMS

James Stewart Macdonald, London, England

Application January 22, 1954, Serial No. 405,571

Claims priority, application Great Britain
January 29, 1953

13 Claims. (Cl. 74—337.5)

This invention relates to gear systems, and in particular to change-gear systems, the object being to provide improvements therein.

In this specification there are used the terms "helical splines" and "helical gears" which mean that the splines and the teeth are disposed helically of the axis of the member on or in which said splines or teeth are disposed; there are also used the terms "parallel splines" and "parallel gears" which mean that the splines and the teeth are disposed parallel to the axis of the member on or in which they are disposed, that is, after the manner of spur teeth.

A gear system according to this invention, for effecting a change from an initial speed ratio between a driving and a driven shaft, comprises a driving shaft, a driven shaft and a lay shaft, gear means providing constant interconnection between said driven and lay shafts, at least two gear members of different diameters disposed concentrically of and adapted to be freely rotatable in relation to said lay shaft, said gear members being in constant engagement with corresponding gear members fixed to the driving shaft whereby to provide said initial and ultimate speed ratios, the lay shaft gear member of the gear providing the initial speed ratio having internal helical splines in an axial bore thereof, helical splines on the lay shaft adapted to be interconnected at the start of a speed ratio change with the internal helical splines in said gear member and to be disconnected therefrom at the finish of said speed ratio change, means for effecting an axial movement of the lay shaft whereby said interconnected helical splines cause a relative rotational movement between the lay shaft and the said gear member provided with internal helical splines to bring the rotational speed of the lay shaft equal to that of the lay shaft gear member of the gear providing the ultimate speed ratio, and means for connecting said driving shaft to said driven shaft and for disconnecting said helical splines from each other when the rotational speeds of said lay shaft and said lay shaft gear member of the gear providing the ultimate speed ratio are equal.

The gear interconnecting means may comprise a lay shaft having two sets of splines along its length the splines of one set thereof being parallel to the axis of the lay shaft and the splines of the other set thereof being helical on the shaft, at least two gear members each of different diameters fixed to the driving shaft or to the driven shaft, at least two gear members concentric with the lay shaft each of said latter gear members being in constant engagement with a said fixed gear member, each said lay shaft gear member having two rings of internal splines in an axial bore thereof the splines of one of said rings thereof being parallel to the axis of the gear member and the splines of the other ring thereof being helical, at least two pairs of dog clutch sleeves slidably mounted on the lay shaft each said pair of sleeves being disposed concentrically between the lay shaft and a gear member thereon, each said sleeve having internal and external splines the splines on one sleeve of a pair being parallel to the axis of the sleeve whilst the splines on the other sleeve of a pair are helical, the internal splines of the sleeves being in permanent axially slidable engagement with the correspondingly shaped splines on the lay shaft whilst the external splines on the sleeves are adapted to be engaged with and disengaged from the correspondingly shaped internal splines in the associated lay shaft gear member when the sleeve is moved axially on the lay shaft and relatively to the lay shaft gear member, and means for moving each sleeve independently and axially on the lay shaft and relative to the lay shaft gear member.

When the top gear ratio between the driving and driven shafts is one to one, the sleeve with parallel splines in respect of said top gear may be disposed on the driving or driven shaft and be adapted to be moved into or out of engagement with internal splines on the driven or driving shaft.

Referring to the accompanying drawings:

Fig. 7 is a longitudinal sectional elevation of a constructional form of gear system according to this invention, taken on line VII—VII of Fig. 8.

Figure 1:
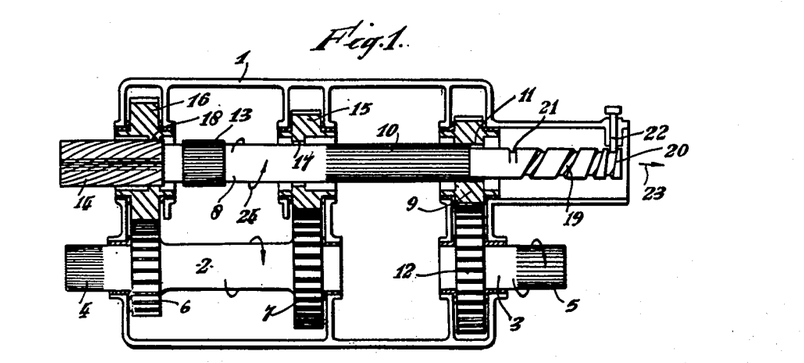
Figs. 1, 2 and 3 illustrate diagrammatically one form of gear system according to this invention for changing up from a low gear ratio to a high gear ratio.
Figure 2:
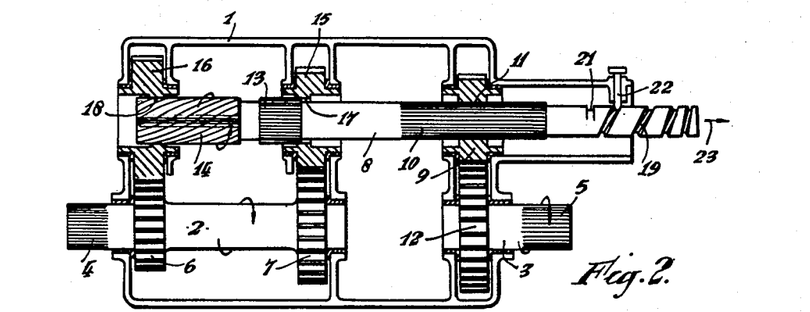
Figure 3:
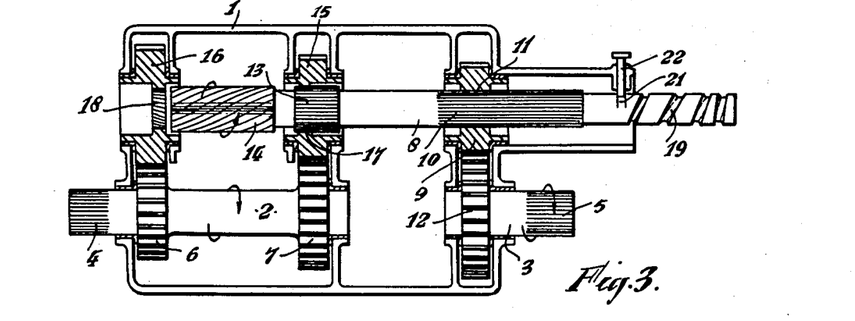

Referring to Figs. 1, 2 and 3, a housing 1 is provided, and a driving shaft 2 and a driven shaft 3 are rotatably mounted in said housing, the said shafts being aligned axially. One end of the driving shaft 2 projects from the housing and is provided with means, for example, splines 4 for connection to a driving source of power, whilst one end of the driven shaft 3 also projects from the housing and is provided with means, for example, splines 5 for connection to means which is or are to be driven. The driving shaft 2 is provided with two gear wheels 6 and 7 each of different diameter which are fixed to the shaft and are suitably spaced apart axially thereon.

A lay shaft 8 is mounted rotatably in the housing 1 and is parallel to the driving and driven shafts 2, 3. The lay shaft 8 is supported, for slidable axial movement, in an axial bore in a gear wheel 9, hereinafter referred to as the lay shaft drive wheel, by means of splines 10 on the shaft which co-act with splines 11 in said bore of the drive wheel 9, which splines are parallel to the axis of the shaft and of the said drive wheel. The lay shaft drive wheel 9 is rotatably mounted in the housing 1 but has no axial movement therein, and it is in constant meshing engagement with a gear wheel 12 which is fixed on the driven shaft 3. A second series of splines 13 is provided externally on the lay shaft 8, each said spline being parallel to the axis of the shaft, the splines of the series being spaced apart circumferentially on the shaft. A third series of splines 14 also is provided externally on the lay shaft 8, each said spline being helically disposed on the shaft, being spaced apart circumferentially on the shaft.

Two gear wheels 15 and 16, hereinafter referred to as the lay shaft gear wheels, are rotatably mounted separately and co-axially in the housing 1, the gear wheel 15 being in constant meshing engagement with the gear wheel 7 on the driving shaft 2, whilst the gear wheel 16 is in constant meshing engagement with the gear wheel 6 on the driving shaft. The gear wheels 15 and 16 are concentric with the lay shaft 8 which passes through axial bores in the said gear wheels.

Each lay shaft gear wheel 15 and 16 is provided in its axial bore with a ring of splines. The splines 17 in the gear wheel 15 are parallel to the axis of the gear wheel and are adapted to be engaged by and disengaged from the parallel splines 13 on the lay shaft 8 when said lay shaft is moved axially relatively to the gear wheel. The splines 18 in the axial bore of the gear wheel 16 are helical and are adapted to be engaged by and disengaged from the helical splines 14 on the lay shaft 8 when said lay shaft is moved axially relatively to the gear wheel.

The lay shaft 8 is extended beyond the splines 10 and is provided with a helical groove 19, the pitch of said helical groove increasing progressively from zero at the outer end 20 to a maximum, and thereafter decreasing progressively to zero at the inner end 21, the variation from zero at the outer end 20 to maximum being accomplished in more revolutions of the shaft 8 than the variation from maximum to zero at the inner end 21.

A pin 22 is mounted in the housing 1 and is adapted to be pressed, by suitable manually or otherwise operated means, radially of the spindle 8 so that it may be caused to enter the helical groove 19 and thereby cause the lay shaft 8 to be moved axially in the direction of the arrow 23, Figs. 1 and 2, when the shaft rotates in the direction of arrow 24, the "hand" of the helical groove 19 being such as to cause such relative movements to be effected.

The low gear wheels 6 and 16 are at the left of the driving and lay shafts in the housing, with the high gear wheels 7 and 15 to the right thereof. When the gear system is in low gear, the helical splines 14 on the lay shaft 8 are in engagement with the internal helical splines 18 in the gear wheel 16, the parallel splines 13 on the lay shaft are out of engagement with, and to the left of, the splines 17 in the gear wheel 15 (as in Fig. 1), and the pin 22 is withdrawn out of engagement with the helical groove 19. When it is desired to change up from low gear to high gear, the pin 22 is pressed in to engage with the end 20 of the helical groove 19 (Fig. 1) so that as the lay shaft 8 rotates, in the direction of arrow 24, the shaft is moved axially in the direction of arrow 23. By reason of the lay shaft 8 being keyed to the low gear wheel 16 by the helical splines 14, 18, the axial movement of the lay shaft 8 causes the said shaft also to have a rotational movement in relation to the gear wheel 16, that is, the lay shaft will rotate faster than the said gear wheel; furthermore, by reason of the constantly increasing pitch of the helical groove 19, the axial movement of the lay shaft is accelerated progressively to a maximum, and consequently the rotational speed of the lay shaft relative to the gear wheel 16 also is accelerated progressively until, at the moment of such maximum relative rotational speed, the lay shaft 8 is rotating at the same speed as the high lay shaft gear wheel 15, whereupon the parallel splines 13 on the lay shaft are engaged with the parallel splines 17 in the gear wheel 15, Fig. 2. The helical splines 14 on the lay shaft are then disengaged from the splines 18 in the gear wheel 16, Fig. 3, and thereupon the axial movement of the lay shaft quickly decelerates to zero and the pin 22 is withdrawn from the groove 19.

Figure 4:
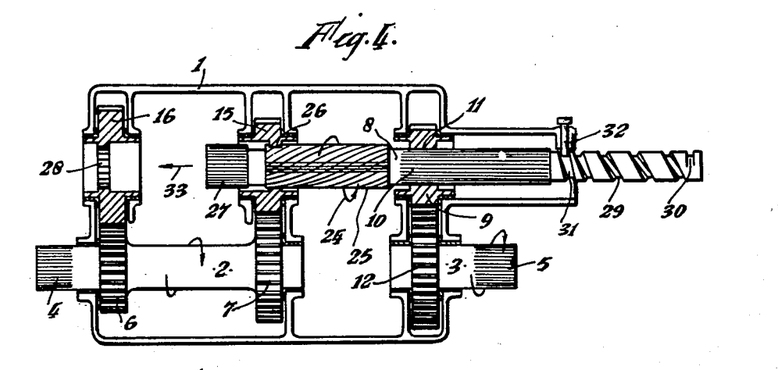
Figs. 4, 5 and 6 illustrate diagrammatically a form of gear system according to this invention for changing down from a high gear ratio to a low gear ratio.
Figure 5:
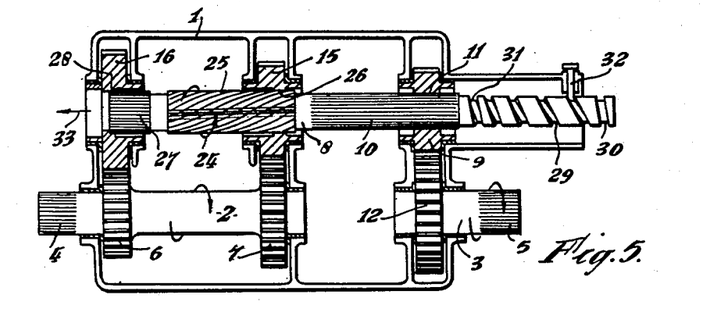
Figure 6:
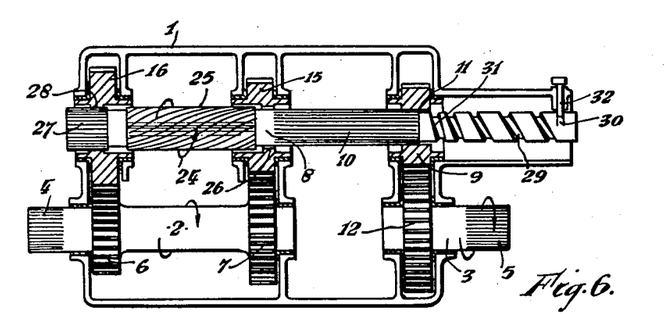

The form of apparatus for changing down from a high gear to a low gear is shown in Figs. 4, 5 and 6, the housing 1, driving shaft 2, driven shaft 3, the lay shaft 8, low gear wheels 6 and 16, high gear wheels 7 and 15, driven gear wheels 9 and 12, and parallel, constantly coacting splines 10 and 11 on the lay shaft 8 and gear wheel 9, being disposed in similar manner to those in Figs. 1, 2 and 3.

The lay shaft 8 is provided with a series of helical splines 25 which are adapted to move into and out of engagement with helical splines 26 in the axial bore of the high gear wheel 15, and is also provided with a series of parallel splines 27 which are adapted to move into and out of engagement with parallel splines 28 in the axial bore of the low gear wheel 16, such engagements and disengagements being effected when the lay shaft moves axially relatively to the gear wheels.

The lay shaft 8 is extended beyond the splines 10 and is provided with a helical groove 29 the pitch of which increases progressively from zero at the inner end 31 to a maximum, and thereafter decreases progressively to zero at the outer end 30, the variation from zero at the inner end 31 to maximum being accomplished in more revolutions of the shaft than the variation from maximum to zero at the outer end 30.

A pin 32 is mounted in the housing 1 and is adapted to be pressed radially of the spindle 8 so that it may be caused to enter the helical groove 29 and thereby cause the lay shaft to be moved axially in the direction of the arrow 33, Figs. 4 and 5, when the shaft rotates in the direction of arrow 24, the "hand" of the helical groove 29 being opposite to that of the helical groove 19, Figs. 1, 2 and 3, so as to cause such relative movements to be effected.

When the gear system is in high gear, the helical splines 25 on the lay shaft 8 are in engagement with the internal helical splines 26 in the gear wheel 15, the parallel splines 27 on the lay shaft are out of engagement with, and to the right of the splines 28 in the gear wheel 16 (as in Fig. 4), and the pin 32 is withdrawn out of engagement with the helical groove 29. When it is desired to change down from high gear to low gear, the pin 32 is pressed into engage with the inner end 31 of the helical groove 29 (Fig. 4) so as the lay shaft 8 rotates, in the direction of arrow 24, the shaft is moved axially in the direction of arrow 33. By reason of the lay shaft being keyed to the high gear wheel 15 by the helical splines 25 and 26, the axial movement of the lay shaft causes said shaft also to have a rotational movement in relation to the gear wheel 15, that is, the lay shaft will rotate slower than the said gear wheel; furthermore, by reason of the constantly increasing pitch of the helical groove 29, the axial movement of the lay shaft is accelerated progressively to a maximum, and consequently the actual rotation speed of the lay shaft is decelerated, and it rotation speed relative to the gear wheel 15 is accelerated, progressively until, at the moment of such maximum relative rotational speed, the lay shaft is rotating at the same speed as the low lay shaft gear wheel 16, whereupon the parallel splines 27 on the lay shaft are engaged with the parallel splines 28 in the gear wheel 16 (Fig. 5). The helical splines 25 on the lay shaft are then disengaged from the splines 26 in the gear wheel 15 (Fig. 6), and thereupon the axial movement of the lay shaft quickly decelerates to zero and the pin 32 is withdrawn from the groove 29.

The constructional form of gear system illustrated in Figs. 7 to 14 provides four forward speeds, a neutral position, and a reverse speed. The driving shaft 2 and the driven shaft 3 are rotatably mounted in the housing 1, the said shafts being aligned axially. One end of the driving shaft 2 projects from the housing and is provided with splines 4 or other suitable means for connection to a driving source of power, whilst one end of the driven shaft 3 also projects from the housing and is provided with splines 5 or other suitable means for connection to means which is or are to be driven. The driving shaft 2 is provided with four gear wheels 34, 35, 36 and 37 each of different diameter and suitably spaced apart axially thereon, the diameters of said gears increasing in succession along the shaft from left to right (Fig. 7). The gear wheels 35, 36 and 37 are fixed to the shaft 2, but the gear wheel 34, which is the low or first gear, is slidably mounted on splines 38 on the shaft so that it may be moved along said shaft when a reverse drive is required, as described hereinafter.

A lay shaft 8 is mounted in the housing 1 and is parallel to the driving and driven shafts. One end of the lay shaft 8 is constantly supported for slidable axial movement in an axial bore in a gear wheel 9, hereinafter referred to as the lay shaft drive wheel, by means of splines 10 on the shaft which co-act with splines 11 in the bore of the gear wheel 9 which splines are parallel to the axis of the shaft and of the said drive wheel. The lay shaft drive wheel 9 is rotatably mounted in bearings in the housing 1 but has no axial movement therein, and it is in constant meshing engagement with a gear wheel 12 which is fixed on the driven shaft 3. The other end of the lay shaft 8 is rotatably mounted in a bearing 39 which is mounted axially slidable in a cylindrical extension 40 of the housing. A first series of splines 41 is provided externally on the lay shaft 8, each said spline being parallel to the axis of the shaft and extending the whole, or approximately the whole length thereof, the splines of the series being spaced apart circumferentially on the shaft; the portions of these splines at the right-hand end (Fig. 7) of the shaft provide the splines 10 for axial slidable engagement with the splines 11 on the lay shaft drive wheel 9. A second series of splines 42 also is provided externally on the lay shaft 8, each said spline being helically disposed on the shaft and extending a substantial distance along the shaft, being spaced apart circumferentially on the shaft; the helical splines 42 are interrupted at the places where they would otherwise cross the grooves between the parallel splines 41, and, in fact, the portions of the helical splines 42 are disposed only across the parallel splines 41, as is apparent in Fig. 7.

Four gear wheels 43, 44, 45 and 46, hereinafter referred to as the lay shaft gear wheels, are rotatably mounted separately and co-axially in the housing 1 and non-axially movable in the housing, each said gear wheel 44, 45 and 46 being in constant meshing engagement with the gear wheels 35, 36 and 37, respectively, on the driving shaft 2, the gear wheel 43 being in engagement with the gear wheel 34 for a first gear forward drive. The gear wheels 43, 44, 45 and 46 are concentric with the lay shaft 8 which passes freely through axial bores in the said gear wheels.

Four pairs of sleeves 47 and 48, 49 and 50, 51 and 52, and 53 and 54 are provided, each pair of sleeves being associated with one of the lay shaft gear wheels. One sleeve 47, 49, 51 and 53, of each pair will be referred to hereinafter as a parallel sleeve, whilst the other sleeve, 48, 50, 52 and 54, of each pair will be referred to as a helical sleeve. Whilst the four pairs of sleeves may all be mounted on the lay shaft 8, and are so mounted when the top or fourth gear ratio is not one to one, it is preferred, when said top gear ratio is one to one, and for the reason that will be described, that the parallel sleeve 53 associated with the top-gear wheels 37, 46 on the driving and lay shafts shall be on the driving shaft, and it is so disposed in the arrangement illustrated. Each said sleeve is provided with a series of internal splines and also with a series of external splines. The internal and external splines on the parallel sleeves 47, 49, 51 and 53 are parallel to the axis of the sleeve, the internal splines of those parallel sleeves 47, 49 and 51 which are on the lay shaft 8 being in constant axial slidable engagement with the parallel splines 41 on the lay shaft, whilst the internal splines of the parallel sleeve 53 which is on the driving shaft 2 are in constant axial slidable engagement with parallel splines 55 on said driving shaft. The internal and external splines on the helical sleeves 48, 50, 52 and 54 are helical, the internal splines being in constant axial slidable engagement with the helical splines 42 on the lay shaft 8.

Whilst each lay shaft gear wheel 43, 44, 45 and 46 may be provided in its axial bore with two separate rings of internal splines the two rings being spaced apart in an axial direction, and are so provided when the top or fourth gear ratio is not one to one, it is preferred when the top gear ratio is one to one, and for the reason that will be described, that the lay shaft gear wheel in respect of the top gear be provided with only one ring of internal splines, two rings of internal splines being provided in the other lay shaft gear wheels. The internal splines of one ring 56, 57 and 58 in each lay shaft gear wheel 43, 44 and 45, respectively, are parallel to the axis of the gear wheel and are adapted to be engaged by and disengaged from the external splines on the associated parallel sleeves 47, 49 and 51, respectively, when said sleeve is moved axially relatively to the respective gear wheel. The internal splines of the other rings 60, 61 and 62, in the said lay shaft gear wheels 43, 44 and 45 respectively, and the one ring 63 in the top gear lay-shaft gear wheel 46 are helical and are adapted to be engaged by and disengaged from the external splines on the associated helical sleeves 48, 50, 52 and 54, respectively, when said sleeves are moved axially relatively to the respective gear wheel. The gear wheel 12 which is fixed to the driven shaft 3 is provided axially with a ring 59 of internal parallel splines, which are adapted to be engaged by and disengaged from the external splines on the parallel sleeve 53 on the driving shaft 2 when said sleeve is moved axially relatively to the gear wheel.

Each sleeve 47—54 is provided with means, independently actuable by suitable selector means to be described hereinafter, for causing the sleeve to be moved on its shaft axially in relation to its associated gear wheel on the lay shaft or driven shaft.

At that end of the lay shaft 8 which is remote from the slidable bearing 39 for the shaft, a yoke 64 is mounted on the shaft, the shaft being rotatable in bearings 65 in the yoke but restrained against relative axial movement by collars 66 on the shaft. The helical grooves of opposite hands which were provided on extensions of the lay shaft (19 and 29 in Figs. 1 and 4) are now both provided on separate spindles 67 and 68. There are, in fact, for the purpose of evenly distributing and balancing the axial thrusts and other pressures, two series of spindles 67 and 68, there being, as exemplified in Fig. 9, four spindles 67 with right-hand helical grooves 72 in one series, and four spindles 68 with left-hand helical grooves 73 in the other series, spindles of each series alternating with each other around the yoke 64 and lay shaft 8. The spindles 67 and 68 are mounted rotatably in an extension 69 of the housing 1 and are parallel to the lay shaft 8, the said spindles passing freely through the yoke 64, and each said spindle having gear wheel teeth 70 on one end which are in meshing engagement with a subsidiary gear 71 on the lay shaft drive wheel 9 so that as the lay shaft 8 and the drive wheel 9 are rotated the said spindles 67, 68 also are rotated all in the same rotary direction. The helical grooves 72 on the spindles 67 have a pitch which increases progressively from zero at the inner end 75 to a maximum, and thereafter decreases progressively to zero at the outer end 74, the variation from zero at 75 to maximum being accomplished in more revolutions of the shaft than the variation from maximum to zero at 74. The helical grooves 73 on the spindles 68 are formed in the opposite manner.

In the yoke 64, there are provided rollers 76 which are adapted to be pressed, by means described hereinafter, radially relatively to the spindles 67, 68, so that one set of rollers may be caused to enter the helical grooves 72 in the spindles 67, or alternatively the other set of rollers are caused to enter the helical grooves 73 in the spindles 68, and thereby cause the yoke 64, and consequently also the lay shaft 8, to be moved axially in the direction appropriate to the hand of the helical grooves on said spindles.

When the gear system is in low or first gear, the parallel sleeve 47 associated with the lay shaft gear wheel 43 is in engagement with the internal parallel splines 56 in said gear wheel, and all of the other sleeves are out of engagement with their associated gear wheels. When it is desired to change up from low or first gear to second gear, the helical sleeve 48 is moved axially so that it engages the helical splines 60 in the gear wheel 43, and the parallel sleeve 47 is then moved out of engagement with said gear wheel 43, this position being shown in Fig. 7. The rollers 76 appropriate to the spindles 67 for causing the lay shaft 8 to be moved axially to the right are pressed in so that the lay shaft is moved to the right. By reason of the lay shaft now being keyed to the first lay shaft gear wheel 43 by the helical sleeve 48, the axial movement of the lay shaft causes the lay shaft also to have a rotational movement in relation to said gear wheel; furthermore, by reason of the constantly increasing pitch of the helical grooves 72 on the spindles 67, the axial movement of the lay shaft is accelerated constantly to a maximum, and consequently the rotational speed of the lay shaft relative to the gear wheel 43 also is accelerated constantly until, at the moment of such maximum relative rotational speed, the lay shaft 8 is rotating at the same speed as the second lay shaft gear wheel 44, whereupon the parallel sleeve 49 is engaged with the gear wheel 44 and the helical sleeve 48 is disengaged from the gear wheel 60, and thereupon the axial movement of the lay shaft quickly decelerates to zero. The rollers 76 are then disengaged from the helically grooved spindles 67 and the other rollers 76 are engaged with the helical grooves 73 of opposite hand of the other spindles 68, whereupon the lay shaft 8 is moved back from right to left without any gear change being effected, no sleeves being moved axially of the lay shaft gear wheels during this return movement of the lay shaft.

The same procedure is adopted for subsequent changes up to third and fourth or top gears.

For changes down from a higher gear to a low gear the same procedure is effected, except that axial movement of the sleeves is effected during the return right to left movement of the lay shaft, the left to right movement of the lay shaft being idle; the sequence of movement of the sleeves is to first engage the helical sleeve of the higher gear with the higher lay shaft gear wheel, then disengage the parallel sleeve from said gear wheel, then engage the parallel sleeve with the lower lay shaft gear wheel, and lastly the helical sleeve is disengaged from the higher lay shaft gear wheel, the rotational speed of the lay shaft decreasing as the shaft moves from right to left.

The means for engaging the yoke 64 with the helically grooved spindles 67 or 68 are preferably rollers 76 of comparatively large diameter, and they are disposed with their axes inclined to the axes of the spindles, as indicated in Fig. 7, the axes of the rollers for engaging the grooves 72 being inclined in the opposite direction to those for engaging the grooves 73, the helical grooves on the spindles being formed after the manner of buttress threads so that an increased area of contact between the rollers and the grooves is obtained and strong rollers of comparatively large diameter may be used. The rollers may have bevelled edges, as shown at 77, Fig. 7, which give an approximation to true rolling contact with the faces of the grooves.

A convenient form of means for effecting appropriate selection and movement of the sleeves for effecting movement up or down from one gear to the next will be described.

Each sleeve is associated with a lever 78, one lever for each sleeve, which is mounted on a spindle 79, one spindle for each lever, disposed at right angles to the lay shaft. The lever 78 is in the form of a yoke (Figs. 7 and 8) having pins 80 which engage an annular groove 81 in the sleeve so that when the spindle 79 is rocked the sleeve will be moved in one direction or the other on its shaft irrespective of whether the sleeve and shaft are rotating or not. Each lever spindle 79 is provided with a rocker 82 (Figs. 8, 10, 12, 13 and 14), keyed thereto, which is provided with lobes 83, 84 and is adapted to be engaged by a pin 85 on a crosshead 86 (Figs. 8, 10 to 14) which is movable on guide rods 87, 87 in directions parallel to the lay shaft 8. When the pin 85 moves across a rocker 82 it first engages one lobe 83 or 84 on the rocker to cause the lever 78 to move the sleeve in one direction to engage with its associated lay shaft gear wheel and then the pin engages another lobe 84 or 83 on said rocker whereby to move the sleeve in the other direction on the shaft. When the device is in, for example, low gear, the parallel sleeve 47 is in engagement with the lay shaft gear wheel 43, and the pin 85 on the crosshead 86 is in engagement with the associated rocker 82, the pin being in the position between the two lobes 83, 84. Conveniently, the rocker spindles for the parallel sleeves 47, 49, 51 and 53 are all parallel to each other in one plane parallel to the lay shaft whilst the rocker spindles for the helical sleeves 48, 50, 52 and 53 are all parallel to each other in another plane parallel to the lay shaft, and two pairs of pins are mounted on the cross-head 86, one pair of pins 85, 88 engaging the parallel sleeve rockers 82, 91, 92 and 93 (Fig. 10) and the other pair of pins 89, 90 engaging the helical sleeve rockers 94, 95, 96 and 97. A pair of pins is preferred to one pin, one pin 85, 89 of a pair engaging the top face of a rocker when moving up from one gear to a higher gear, and the other pin 88, 90 engaging the bottom face of a rocker when moving down from one gear to a lower gear the appropriate pin of a pair being projected from the crosshead 86, in the manner to be described, to make engagement with the rocker. As the parallel sleeve 53 for top or fourth gear is on the driving shaft 2, the rocker 93 and the lever 78 therefor are mounted on separate spindles interconnected by linkage 150, 151 and 152 (Fig. 10).

Figure 10:
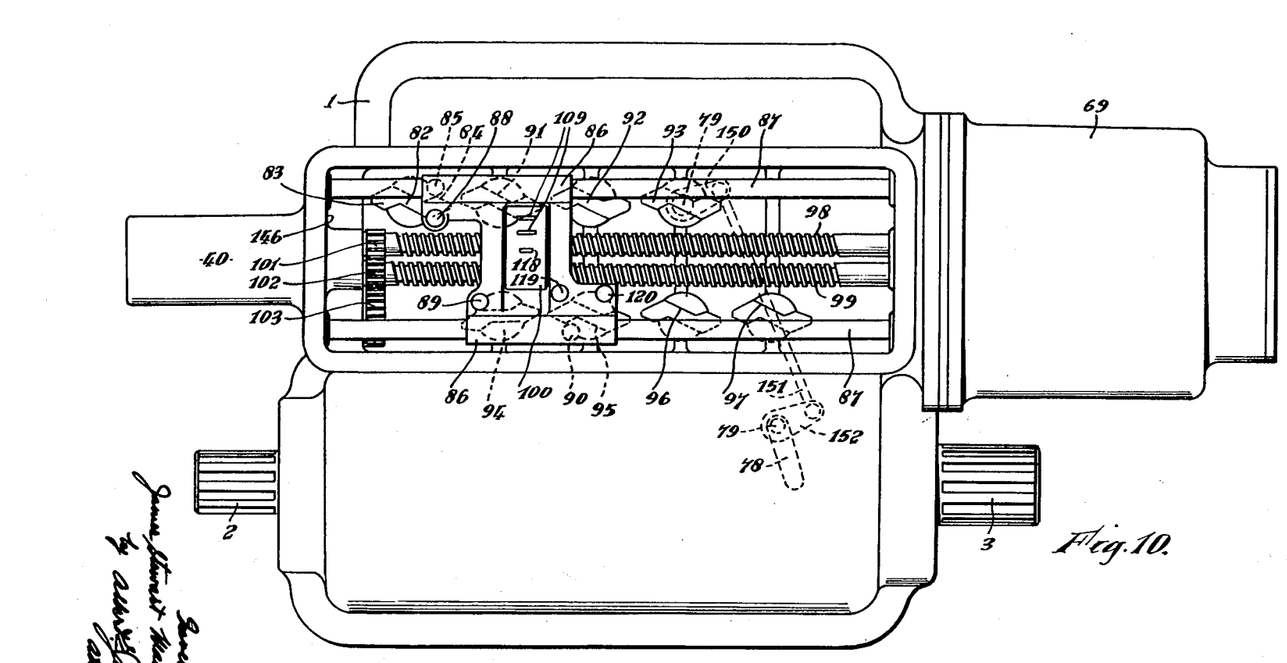
Fig. 10 is a side elevation, on line X—X of Fig. 8.

When the gearing is operated to move from a low gear to the next higher gear, the helical sleeve associated with the lower gear is first moved into engagement with the said lower gear lay shaft gear wheel, the parallel sleeve of the lower gear is then moved out of engagement with said lay shaft gear wheel, the parallel sleeve associated with the higher gear is then moved into engagement with the said higher gear lay shaft gear wheel (or the driving shaft gear wheel in the case of fourth gear), and finally the said helical sleeve is moved out of engagement with the lower gear lay shaft gear wheel, all such operations being effected in succession at appropriate timing during one movement of the crosshead 86 from left to right (Fig. 10). Similar movements, in reverse order, are effected for moving down from a higher gear to the next lower gear, the crosshead moving from right to left.

Figure 13:
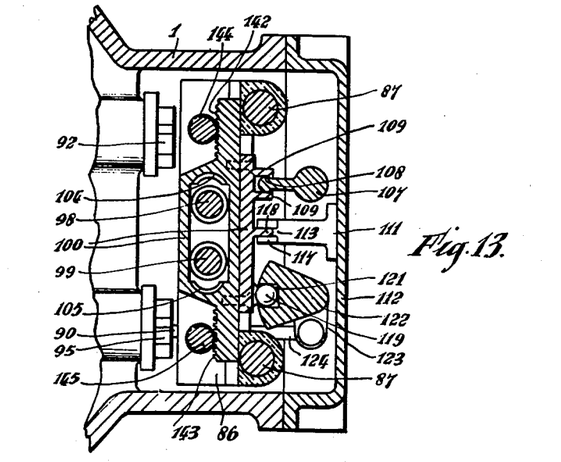
Fig. 13 is a transverse sectional elevation, on line XIII—XIII of Fig. 11.
Figure 14:
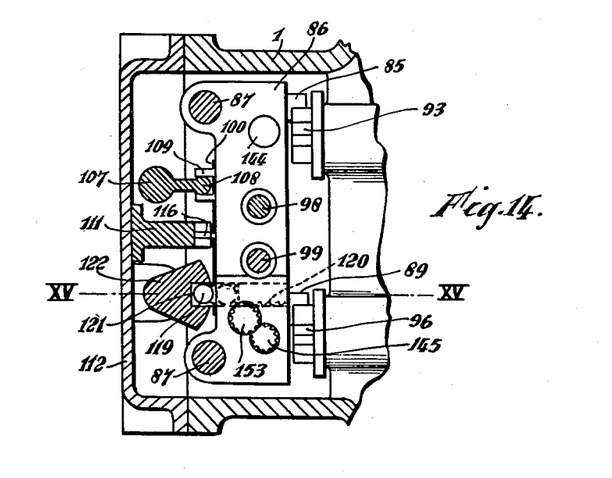
Fig. 14 is a transverse sectional elevation on line XIV—XIV of Fig. 11.

Two screw-threaded spindles 98, 99 (Fig. 13) parallel to each other and to the lay shaft, and one above the other, pass through a nut 100 in the crosshead 86, the said two spindles being provided with threads of the same hand, and being adapted to rotate in opposite directions and to rotate continuously whilst the driving shaft 2 is rotating, through the medium of interconnecting gearing 101, 102 and 103. The screw thread on the said crosshead nut 100 is split, one half, the upper half 104, of the thread being disposed above the upper spindle 98 whilst the other half, the bottom half 105, of the thread is disposed below the bottom spindle 99. The normal position of the nut is with both halves of the screw thread disengaged from the two spindles (Fig. 13). The nut 100 is movable in the cross head 86, in directions at right angles to the two spindles 98, 99, so that when the nut is moved in one direction the screw thread thereon is put into engagement with one spindle 98 or 99 whereby the crosshead is caused to travel in one direction along the guides 87, and vice versa when the nut is moved in the other direction. The movement of the nut is effected by a hand- or finger-operated lever 106 mounted on a shaft 107 which is mounted rotatably in a cover plate 112 of the housing 1 and which is parallel to the screw-threaded spindles 98, 99, the said shaft being provided throughout the whole or part of its length with a feather or rib 108 which engages between two projections 109, 109 on the nut 100 whereby when the shaft 107 is moved in one angular direction or the other the nut is moved correspondingly in the crosshead 86. The lever 106 on said shaft 107 is normally held in a central position by opposed centralising springs 110, 110, and is so arranged that when the said lever is raised the nut 100 on the crosshead 86 is moved into engagement with the screwed spindle 99 which will cause the crosshead 86 to move from left to right and thereby effect movement up from one gear to another; similarly, depression of the lever 106 will cause the crosshead 86 to move from right to left to effect movement down from one gear to another.

In order to avoid having manually to hold the lever 106 up or down whilst a gear change is being effected, a straight bar deflector 111 is mounted rigidly in a cover plate 112 of the housing 1 and is provided at each end 113, 114, and at two intermediate gaps or interruptions 115, 116 with tapered ramps 117 such as to be engaged by a projection 118 on the nut 100 and thereby guide said projection onto the upper or lower face of said deflector. When the device is operating in bottom or first gear, the said projection 118 is disposed at the left-hand end 113 of the deflector 111 (this position being shown in Fig. 11), at the right-hand end 114 of the deflector when the top or fourth gear is operating, and in one of the two intermediate interruptions 115, 116 when operating in second or third gear, respectively. When the lever 106 is touched momentarily, the nut 100 is partly engaged by one of the screwed spindles 98, 99, thereby causing the crosshead to travel along the guides 87. Thereupon, the projection 118 rides up or down one of the adjacent ramps 117 and onto the upper or lower face of the deflector 111, and thereby the nut is retained in engagement with the screwed spindle 98 or 99, without the driver having to retain hold of the lever 106, until the travel of the crosshead 86 takes the projection 118 to the next interruption in or end of the deflector, whereupon the centralising springs 110 throw the lever 106 and shaft 107 into the central position, the nut 100 is removed from engagement with the spindle 98 or 99, and travel of the crosshead ceases. The travel of the projection 118 on the crosshead 86 between an end 113 or 114 of the deflector 111 and the next interruption 115 or 116 therein, or between the two interruptions 115 and 116 is such as to allow the lay shaft 8 to move axially from its rest position, from left to right to complete a movement up from one gear to the next, and thereafter return to its rest position from right to left without effecting gear changing, or to move from left to right without effecting gear changing and then to move from right to left to complete a movement down from one gear to the next.

There are two pins 119, 120, which preferably are ball-headed, on the crosshead 86 and either of these ball-headed pins is adapted, in the manner hereinafter described, to be projected from the crosshead so as to engage an undulating slot 121 in another shaft 122 which is parallel to the lay shaft and which is mounted in the housing cover 112 for oscillation about its axis. The said shaft 122 is connected by a lever 123, link 124 and lever 125 (Fig. 9) to a shaft 126 having a feather or rib 127, the feather 127 engaging a slot 128 in a cam plate 129 mounted on the yoke 64 which surrounds the lay shaft 8 and through which pass the two series of helically grooved spindles 67, 68. The cam plate 129 is provided with two series of slots 130, 131, inclined in opposite directions, each slot being engaged by a pin 132 on a forked lever 133 which is pivotally mounted at 134 on the yoke 64 and which is provided with pins 135 to engage an annular groove 136 on one of the rollers 76 in the yoke which is adapted to engage a said helically grooved spindle. When the shaft 122 is rotated in one direction the cam plate 129 is slightly rotated about the axis of the lay shaft 8 to cause one set of levers 133 on the yoke 64 to press the associated rollers 76 into engagement with the helical grooves of one hand on one set of spindles 67 or 68, and when rotated in the opposite direction to cause the other rollers 76 to be moved into engagement with the helical grooves of the opposite hand on the other set of spindles 68 or 67.

Figure 11:
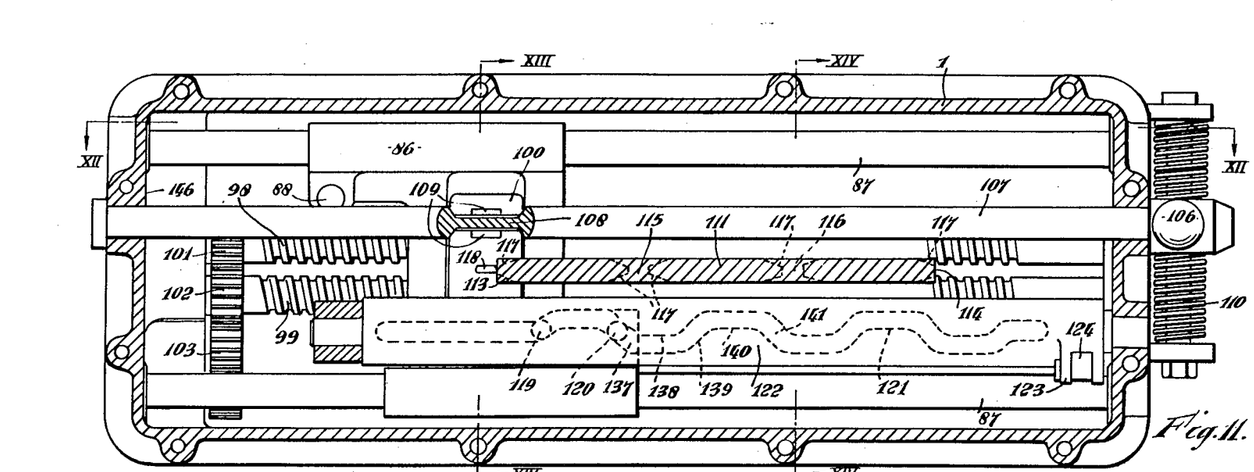
Fig. 11 is a longitudinal sectional elevation of part of the apparatus, on line XI—XI of Fig. 8.
Figure 12:
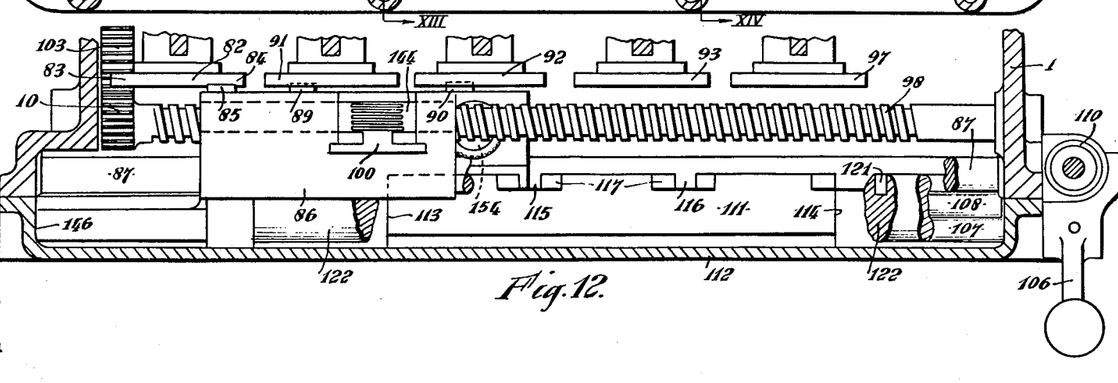
Fig. 12 is a fragmentary sectional plan view, on line XII—XII of Fig. 11.

The undulating groove 121 in the shaft 122 is such that when the device is operating on one gear, the projected ball-headed pin 119 or 120 is in a central position of said groove (Figs. 11, 12, 13). When the crosshead 86 commences to travel, the said pin moves along an inclined portion 137 of the groove 121 such as to cause the shaft 122 to rotate and thereby cause the rollers 76 on the yoke 64 to engage the helically grooved spindles 67 which cause the lay shaft 8 to move from left to right, such engagement being retained by the pin 119 or 120 moving along a straight portion 138 of the undulating groove 121 until the gear change up, or a free left to right movement of the lay shaft is completed, whereupon the pin moves along another inclined portion 139 of the groove 121 and causes the shaft 122 to rotate in the opposite direction and effect withdrawal of said rollers 76 from the associated helically grooved spindles 67 and cause the other rollers 76 to engage the helical grooves of the opposite hand on the other set of spindles 68, thereby causing the lay shaft 8 to move from right to left, such engagement being retained by the pin 119 or 120 moving along another straight portion 140 of the undulating groove 121 until the free right to left movement of the lay shaft, or the gear change down, is completed; thereupon the pin moves along a part of another inclined portion 141 of the groove 121 to a central position of the groove and causing the shaft 122 to effect withdrawal of the rollers 76 from the spindles 68, the linear distance between the two adjacent stop positions of the pin in the groove 121 being equal to the length of travel of the crosshead 86 in one complete gear change movement up or down, that is, the distance between an end 113 and an intermediate gap 115 in the deflector 111.

Figure 15:
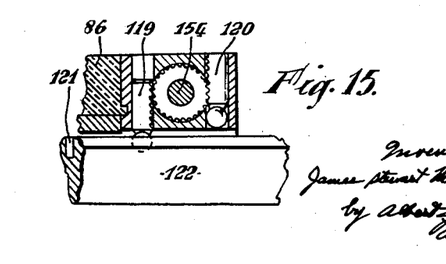
Fig. 15 is a fragmentary sectional plan view on line XV—XV of Fig. 14.

The nut 100 in the crosshead 86 is provided with toothed racks 142, 143 (Fig. 13) which engage two toothed spindles 144, 145 in the crosshead. One spindle 144 also engages toothed racks on the two pins 85, 88 which actuate the rockers 82, 91, 92 and 93 for the parallel sleeves, whilst the other spindle 145 also engages toothed racks on the two pins 89, 90, which actuate the rockers 94, 95, 96 and 97 for the helical sleeves. The engagement of a spindle 144 or 145 with the said pins 85, 88 or 89, 90 is at diametrically opposed positions of said toothed spindle, so that when the nut 100 is moved to effect, for example, a left to right movement of the crosshead 86, the pins 85 and 89 which engage the upper faces of the rockers are projected and the other pins 89, 90 are retracted into the crosshead (Fig. 8), and vice versa when the nut is moved to effect a right to left movement of the crosshead. Similarly, the two ball-headed pins 119 and 120 are each provided with a toothed rack. The rack on the pin 120 is interconnected to the toothed spindle 145 by an idler 153 (Fig. 14) so that as the spindle 145 is rotated the pin 120 is projected into or retracted from the groove 121. The two pins 119 and 120 are interconnected by the racks thereon and by a toothed gear wheel 154, Figs. 12 and 15, so that as one pin is projected the other is retracted, and vice versa. One of the ball-headed pins is projected to engage the undulating groove when the crosshead moves from left to right and the other ball-headed pin is projected to engage the said groove when the crosshead moves from right to left, the relative positions of the two ball-headed pins being such that no matter in which direction the crosshead moves, the initial movement of the lay shaft will be from left to right.

Figure 8:
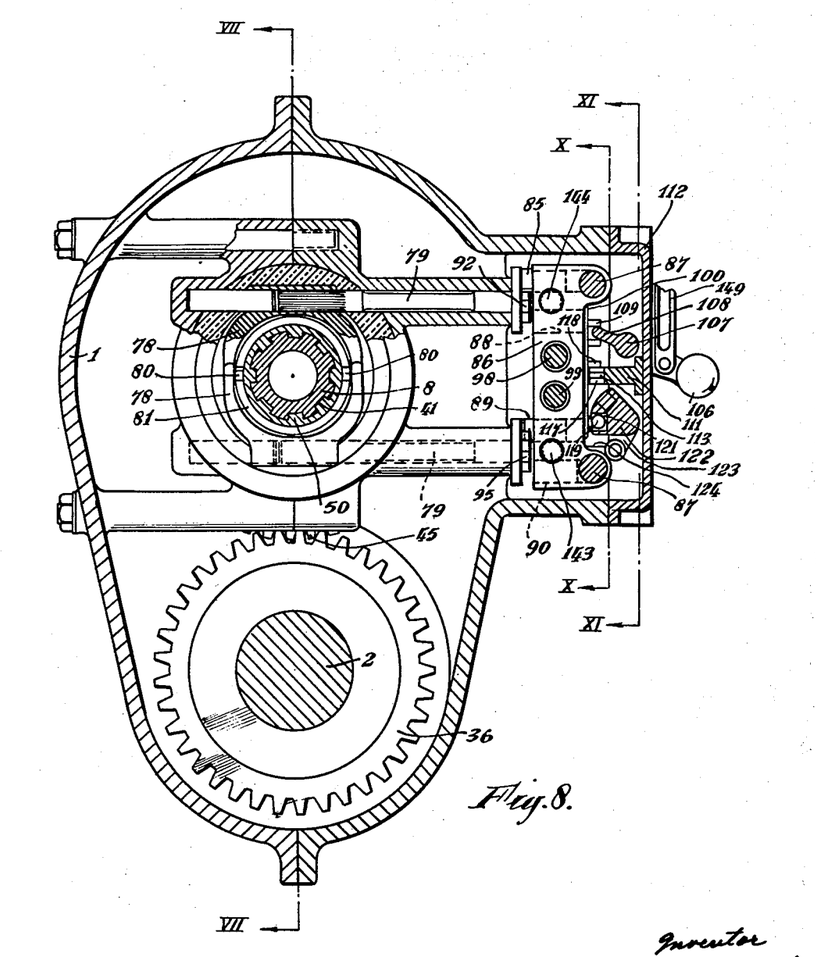
Fig. 8 is a transverse sectional elevation, taken on line VIII—VIII of Fig. 7.
Figure 9:
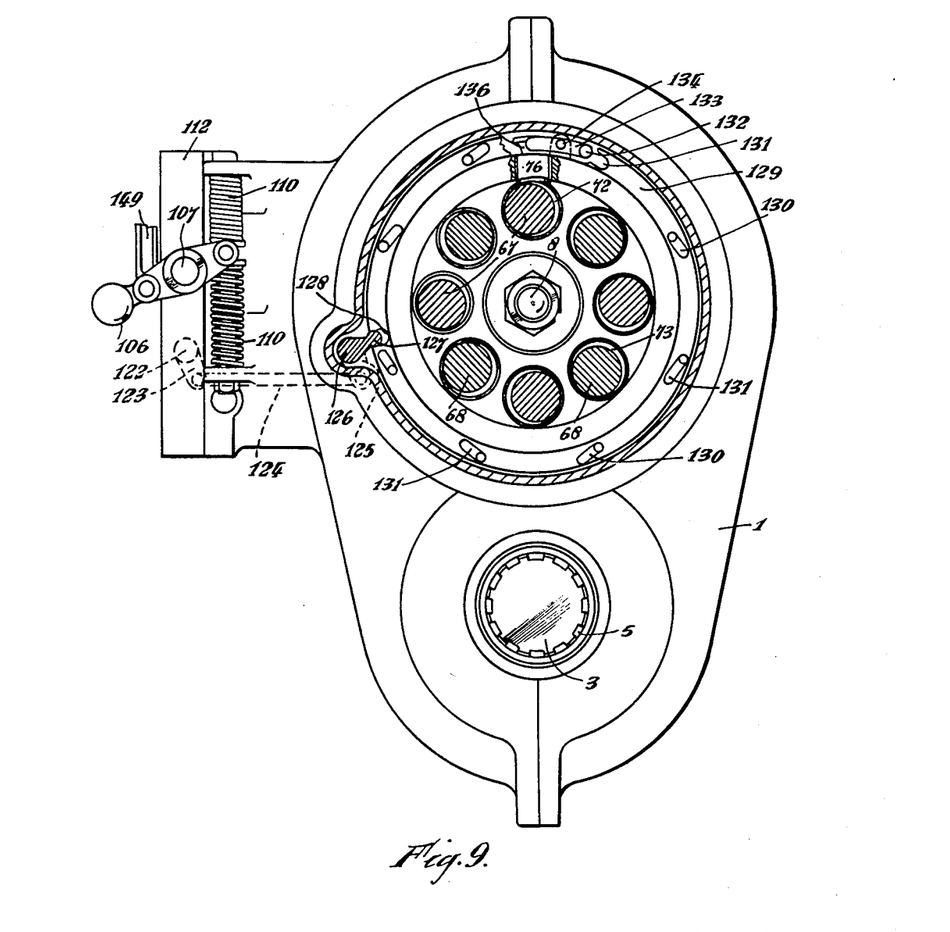
Fig. 9 is a transverse sectional elevation, taken on line IX—IX of Fig. 7.

The manually operated lever 106, or the feathered spindle 107 for effecting movement of the nut 109 in the crosshead 86, may be connected by suitable link or other mechanism, for example, the link 149 in Figs. 8 and 9, to an engine governor whereby said spindle 107 may be actuated automatically when the engine revolutions change sufficiently to require gearing up or down.

If, as is preferable, the high or fourth gear gives a ratio of one to one between the driving and driven shafts 2 and 3, an indirect transmission between these two shafts by way of the lay shaft 8 can be short-circuited so as to give a direct drive between the said driving and driven shafts. It is for this purpose that the fourth gear parallel sleeve 53 is mounted on the driving shaft 2 and its external splines are adapted to engage with an internal ring of splines 59 in the driven gear wheel 12.

The transmission can be put into neutral gear by disengaging all of the sleeves from the lay shaft gear wheels. This can be effected by moving the crosshead 86 on the guides 87 to an extreme left position which is limited by an end wall 146 of the housing 1 (Figs. 10, 11 and 12), such movement being effected by suitable means.

Reverse drive is provided by conventional means. For example (Fig. 7), the first gear wheel 34 on the driving shaft 2 may be slid on the splines 38 out of mesh with the first gear wheel 43 on the lay shaft 8, and another gear wheel 147 on the driving shaft, which may be of smaller diameter than the wheel 34, may be slid on the said splines into connection with the lay shaft gear wheel 43 through another idler gear wheel 148.

The bearing 39 for the left-hand end of the lay shaft 8 may be in the form of a piston disposed slidably in a cylindrical extension 40 of the housing. The forces involved in moving the lay shaft axially are appreciable, owing to the reaction of the transmitted torque on the helical splines. In some applications it may be convenient to reduce the load on the spindles 67, 68 and rollers 76 by applying pneumatic or hydraulic pressure to the outer face of the piston 39, or by means of springs.

The gear change takes place in a very short period of time, in fact, in the time required for a few revolutions of the lay shaft. Although the process is stepless and free of shock, it may involve rapid changes of engine speed. In such cases it would be a simple matter to add another function to the crosshead movement, namely, that of momentarily adjusting the engine's power output to assist these changes and avoid the development of excessive transitory torques due to inertia forces.

What I claim and desire to secure by Letters Patent is:

1. A gear system, for effecting a change from an initial speed ratio between a driving and a driven shaft, comprising a driving shaft, a driven shaft and a lay shaft, gear means providing constant interconnection between said driven and lay shafts, at least two gears members of different diameters disposed concentrically of and adapted to be freely rotatable in relation to said lay shaft, said gear members being in constant engagement with corresponding gear members fixed to the driving shaft whereby to provide said initial and ultimate speed ratios, the lay shaft gear member of the gear providing the initial speed ratio having internal helical splines in an axial bore thereof, helical splines on the lay shaft adapted to be interconnected at the start of a speed ratio change with the internal helical splines in said gear member and to be disconnected therefrom at the finish of said speed ratio change, means for effecting an axial movement of the lay shaft whereby said interconnected helical splines cause a relative rotational movement between the lay shaft and the said gear member provided with internal helical splines to bring the rotational speed of the lay shaft equal to that of the lay shaft gear member of the gear providing the ultimate speed ratio, said helical splines being so relatively disposed on the lay shaft and in the lay shaft gear member of the gear providing the initial speed ratio respectively that they are disconnected from each other by said axial movement of the lay shaft when the rotational speeds of said lay shaft and said lay shaft gear member of the gear providing the ultimate speed ratio are equal, and additional means actuated by axial movement of said lay shaft for completing a driving connection between said driving shaft and said driven shaft when said helical splines are disconnected from each other.

2. A gear system according to claim 1, wherein the said additional means for completing a driving connection between the driving shaft and the driven shaft at the finish of a speed ratio change comprises internal parallel splines in an axial bore of the lay shaft gear member of the gear providing the ultimate speed ratio, and parallel splines on the lay shaft, said parallel splines being so relatively disposed on the said gear member and lay shaft respectively that they are connected to each other by said axial movement of the lay shaft when said helical splines are disconnected from each other.

3. A gear system according to claim 1, wherein the said additional means for completing a driving connection between the driving shaft and the driven shaft at the finish of a speed ratio change, when the ultimate speed ratio between the driving and driven shafts is one to one, comprises co-acting dogs on said driving and driven shafts adapted to be moved into and out of engagement with each other, and means actuated by axial movement of said lay shaft for moving said dogs into interengagement when said helical splines are disconnected from each other.

4. A gear system according to claim 1, comprising a rotatable spindle having its axis parallel to the lay shaft, said spindle being provided with a helical groove thereon said groove having a pitch increasing constantly from zero at one end to a maximum and thence back to zero at the other end, and means co-operative with said helical groove and with said lay shaft whereby on rotation of said spindle the lay shaft is moved axially.

5. A gear system according to claim 4, comprising two of said spindles provided with helical grooves, the helical groove on one spindle being of opposite hand to the helical groove on the other spindle, and means for selectively operating said co-operating means whereby to move the lay shaft in either axial direction.

6. A gear system according to claim 1, comprising a lay shaft having two sets of splines along its length the splines of one set thereof being parallel to the axis of the lay shaft and the splines of the other set thereof being helical on the shaft, at least two gear members each of different diameters fixed to the driving shaft or to the driven shaft, at least two gear members concentric with the lay shaft each of said latter gear members being in constant engagement with a said fixed gear member, each said lay shaft gear member having two rings of internal splines in an axial bore thereof the splines of one of said rings thereof being parallel to the axis of the gear member and the splines of the other ring thereof being helical, at least two pairs of dog clutch sleeves slidably mounted on the lay shaft each said pair of sleeves being disposed concentrically between the lay shaft and a gear member thereon, each said sleeve having internal and external splines the splines on one sleeve of a pair being parallel to the axis of the sleeve whilst the splines on the other sleeve of a pair are helical, the internal splines of the sleeves being in permanent axially slidable engagement with the correspondingly shaped splines on the lay shaft whilst the external splines on the sleeves are adapted to be engaged with and disengaged from the correspondingly shaped internal splines in the associated lay shaft gear member when the sleeve is moved axially on the lay shaft and relatively to the lay shaft gear member, and means for moving each sleeve independently and axially on the lay shaft and relative to the lay shaft gear member.

7. A gear system according to claim 6, wherein the means for moving said dog clutch sleeves slidably on their shafts comprises a series of rocker elements, one rocker element being connected to each sleeve, and a linearly movable member adapted to engage and rock said rockers in succession during the course of a lineal movement of said member, and means constantly driven from the driving shaft and adapted to be engaged selectively by said movable member whereby lineal movement of said member is effected.

8. A gear system according to claim 7, wherein said constantly driven means for engagement by said movable member and said movable member are provided with alternative interengaging means whereby lineal movement of said movable member may be effected selectively in either direction.

9. A gear system according to claim 8, comprising two rotatable spindles having their axes parallel to the lay shaft, each of said spindles being provided with a helical groove thereon, said groove having a pitch increasing constantly from zero at one end to a maximum and thence back to zero at the other end, the helical groove on one said spindle being of opposite hand to the helical groove on the other spindle, means cooperative with said helical grooves and with said lay shaft whereby on rotation of a said spindle the lay shaft is moved axially, means for selectively operating said co-operating means whereby to move said lay shaft in either axial direction, an element adapted to oscillate and means connecting said element to said linearly movable member whereby said element is caused to oscillate when said movable member is moved linearly, and interconnecting means between said co-operative means associated with said helically grooved spindles and said lay shaft for effecting axial movement of the lay shaft whereby both of said helically grooved spindles are put into co-operative association with said lay shaft in succession to effect axial movement of the lay shaft in both directions successively.

10. A gear system according to claim 1, and wherein one speed ratio between the driving and driven shafts is one to one, comprising a lay shaft having two sets of splines along its length, the splines of one set thereof being parallel to the axis of the lay shaft and the splines of the other set thereof being helical on the shaft, at least two gear members each of different diameters fixed to the driving shaft or to the driven shaft, at least two gear members concentric with the lay shaft each of said latter gear members being in constant engagement with a said fixed gear member, the lay shaft gear member of the gear providing the one to one speed ratio having a ring of internal helical splines in an axial bore thereof, each of the other lay shaft gear members having two rings of internal splines in an axial bore thereof the splines of one of said rings thereof being parallel to the axis of the gear member and the splines of the other ring thereof being helical, a dog clutch sleeve slidably mounted on the lay shaft and disposed concentrically between the lay shaft and the gear member thereon of the gear providing the one to one speed ratio said sleeve having internal and external helical splines thereon, a pair of dog clutch sleeves slidably mounted on the lay shaft concentrically between the lay shaft and each of the other gear members thereon each said sleeve having internal and external splines the splines on one sleeve of a pair being parallel to the axis of the sleeve whilst the splines on the other sleeve of a pair are helical, the internal splines of the sleeves being in permanent axially slidable engagement with the correspondingly shaped splines on the lay shaft whilst the external splines on the sleeves are adapted to be engaged with and disengaged from the correspondingly shaped internal splines in the associated lay shaft gear member, a dog clutch member fixed to either of the driving and driven shafts and a co-acting dog clutch member mounted for axial slidable movement on the other of said driving and driven shafts, and means for moving each said sleeve and said slidable dog clutch member independently and axially on its shaft and relative to its co-acting lay shaft gear member or fixed dog clutch member.

11. A gear system according to claim 10, wherein the means for moving said dog clutch sleeves slidably on their shafts comprises a series of rocker elements, one rocker element being connected to each sleeve, and a linearly movable member adapted to engage and rock said rockers in succession during the course of a lineal movement of said member, and means constantly driven from the driving shaft and adapted to be engaged selectively by said movable member whereby lineal movement of said member is effected.

12. A gear system according to claim 11, wherein said constantly driven means for engagement by said movable member and said movable member are provided with alternative interengaging means whereby lineal movement of said movable member may be effected selectively in either direction.

13. A gear system according to claim 12, comprising two rotatable spindles having their axes parallel to the lay shaft, each of said spindles being provided with a helical groove thereon said groove having a pitch increasing constantly from zero at one end to a maximum and thence back to zero at the other end, the helical groove on one said spindle being of opposite hand to the helical groove on the other spindle, means co-operative with said helical grooves and with said lay shaft whereby on rotation of a said spindle the lay shaft is moved axially, means for selectively operating said co-operating means whereby to move said lay shaft in either axial direction, an element adapted to oscillate and means connecting said element to said linearly movable member whereby said element is caused to oscillate when said movable member is moved linearly, and interconnecting means between said co-operative means associated with said helically grooved spindles and said lay shaft for effecting axial movement of the lay shaft whereby both of said helically grooved spindles are put into co-operative association with said lay shaft in succession to effect axial movement of the lay shaft in both directions successively.

References Cited in the file of this patent

UNITED STATES PATENTS

| | | |
|---|---|---|
| 2,277,614 | Suhner | Mar. 24, 1942 |
| 2,285,856 | Everitt | June 9, 1942 |
| 2,469,881 | Laubach et al. | May 10, 1949 |
| 2,507,640 | MacDonald | May 16, 1950 |